(12) United States Patent
Uremovic

(10) Patent No.: US 6,672,441 B1
(45) Date of Patent: Jan. 6, 2004

(54) CONDUCTOR RAIL SUPPORT

(75) Inventor: Nikola Uremovic, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,340

(22) PCT Filed: Mar. 9, 2000

(86) PCT No.: PCT/DE00/00736

§ 371 (c)(1),
(2), (4) Date: Sep. 24, 2001

(87) PCT Pub. No.: WO00/56569

PCT Pub. Date: Sep. 28, 2000

(30) Foreign Application Priority Data

Mar. 22, 1999 (DE) .......................... 199 12 822

(51) Int. Cl.⁷ ............................................... B60M 1/30
(52) U.S. Cl. ..................... 191/32; 191/22 R; 191/29 R; 439/33
(58) Field of Search .............................. 191/22 R, 23 R, 191/29 R, 30, 31, 32, 49, 59.1, 29 DM, 22 C, 22 DM; 439/33, 502

(56) References Cited

U.S. PATENT DOCUMENTS 3,341,670 A * 9/1967 Martin et al. ................. 191/32
3,806,672 A * 4/1974 Landis ........................ 191/30
3,927,742 A 12/1975 Reynolds et al.
4,318,462 A * 3/1982 Weinhaus ..................... 191/30
4,888,454 A 12/1989 Scarpatetti et al.

FOREIGN PATENT DOCUMENTS

| DE | 1 051 313 |   | 7/1957 |
| DE | 1 293 182 |   | 4/1969 |
| DE | 1 293 182 A | * | 4/1969 |
| DE | 2 312 747 |   | 9/1973 |
| DE | 37 19 213 |   | 5/1988 |
| DE | 32 43 933 |   | 1/1989 |

* cited by examiner

*Primary Examiner*—S. Joseph Morano
*Assistant Examiner*—Frantz F. Jules
(74) *Attorney, Agent, or Firm*—Young & Thompson

(57) ABSTRACT

The live rail support according to the invention has a support body (1) for holding, such that they are electrically isolated, two electrically conductive live rails (2, 3) each having at least one contact sliding surface (4, 5), in which case the live rails (2, 3) can be inserted into the support body (1) in such a manner that the contact sliding surfaces (4, 5) are arranged parallel to the longitudinal axis (6) of the support body (1) and at an angle, which can be predetermined, to the vertical axis (7) of the support body (1) According to the invention, the two live rails (2; 3) can be mounted easily in that the feet of each of the live rails (2, 3) can be inserted into a respective groove (8, 9) in the support body (1), and the live rails (2, 3) can be fixed in their operating position by means of at least one latching-in element (10, 11) which can be plugged on from above.

10 Claims, 2 Drawing Sheets

CONDUCTOR RAIL SUPPORT

BACKGROUND OF THE INVENTION

The invention relates to a live rail support.

A live rail support is disclosed in both DE-B 1 051 313 and DE 37 19 213 C1.

The live rail support which is known from DE-B 1 051 313 has an integral support body. The two live rails are each attached by means of a mounting plate which can be plugged onto the rail foot and, once it has been plugged on, surrounds the rail foot like a claw. The angle of the contact sliding surfaces to the vertical axis of the support body can be predetermined and is 180°. The contact sliding surfaces are thus arranged parallel to the longitudinal axis of the support body, and parallel to the vertical axis of the support body.

The live rail support which is known from DE 37 19 213 C1 has a support body for holding, such that they are electrically isolated, two electrically conductive live rails, each having one contact sliding surface. The contact sliding surfaces of the two live rails run parallel to the longitudinal axis of the support body and are arranged such that they are inclined with respect to one another in a V-shape rising outward, with the included angle between them being approximately 90°. The essentially triangular live rails are held without screws on the support body by virtue of their corresponding shape.

Furthermore, DE-A 2 312 747 discloses a supporting apparatus for a polyphase contact rail section, in which the electrical conductors are fixed on the supporting apparatus by means of screws.

Furthermore, DE 32 43 933 C2 discloses a live rail support whose support body is attached to a live rail arm. The support body has an attachment plate composed of insulating material for two live rails. The upper parts of the two live rails surround the attachment plate, which is attached to the live rail arm via a threaded bolt and nuts with a securing plate. For this purpose, the threaded bolt is inserted into an opening in the live rail arm. Although the known live rail support allows the height of the live rails to be adjusted, its construction is relatively complex, however, and requires a corresponding amount of effort to install.

SUMMARY OF THE INVENTION

The object of the present invention is to provide a structurally simple live rail support which allows two live rails to be mounted, such that they are isolated, in a simple manner.

The live rail support of the present invention as a support body for holding, such that they are electrically isolated, two electrically conductive live rails each having at least one contact sliding surface, in which case the live rails can be inserted into the support body in such a manner that the contact sliding surfaces are arranged parallel to the longitudinal axis of the support body and at an angle, which can be predetermined, to the vertical axis of the support body.

According to the invent invention, the two live rails can be mounted easily in that the feet of each of the live rails can be inserted into a respective groove in the support body, and the live rails can be fixed in their operating position by means of at least one latching-in element which can be plugged on from above. Each live rail can be fixed in an advantageous manner by means of its own latching-in element.

For the purposes of the invention, the electrically conductive live rail can be held, such that it is electrically isolated, either by the support body being manufactured from an electrically insulating material, preferably plastic, or alternatively by the support body just having inserts composed of an electrically insulating material.

BRIEF DESCRIPTION OF THE DRAWINGS

An exemplary embodiment of the invention will be explained in more detail in the following text with reference to the drawing, in which.

DETAILED DESCRIPTION OF THE PREFERRED EMBODIMENTS

Figure 1:
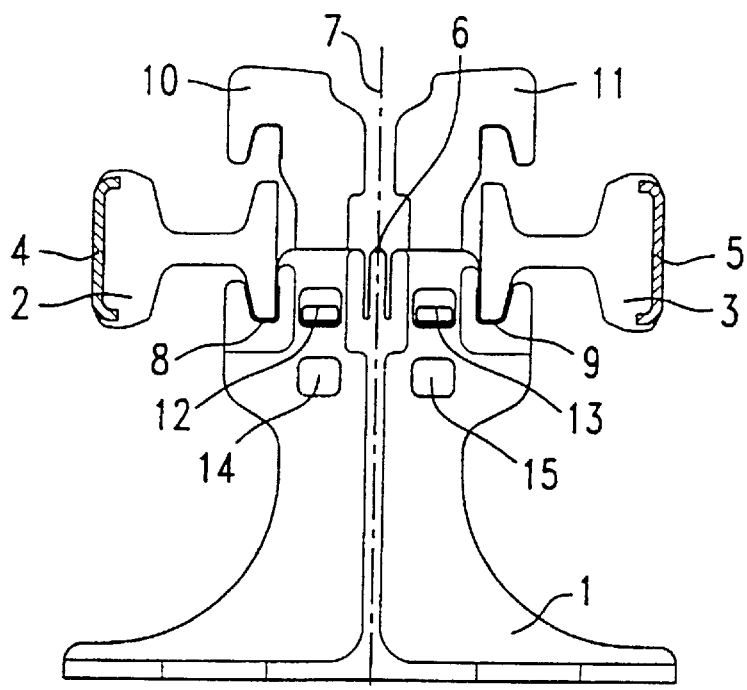
FIG. 1 shows a support body which is mounted between two rails of a track in a first assembly step.
Figure 2:
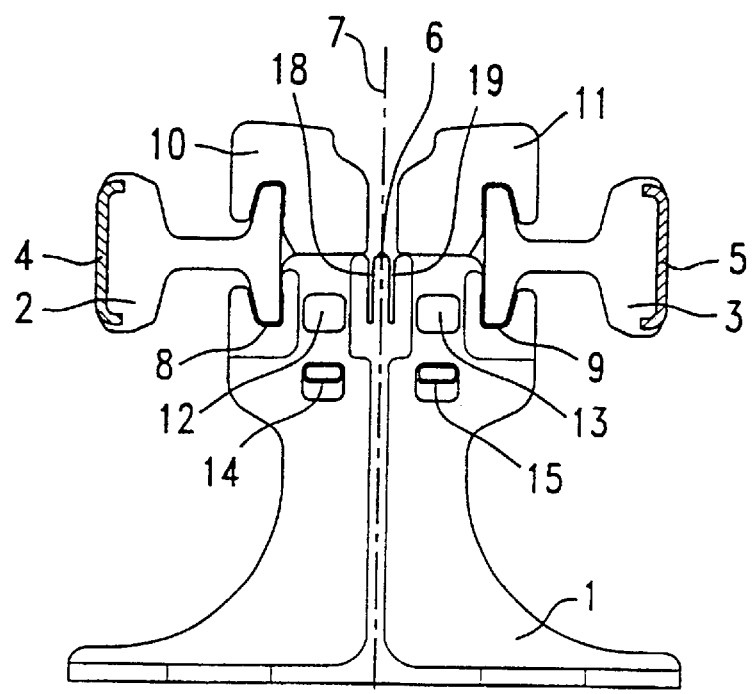
FIG. 2 shows the support body in another assembly step.
Figure 3:
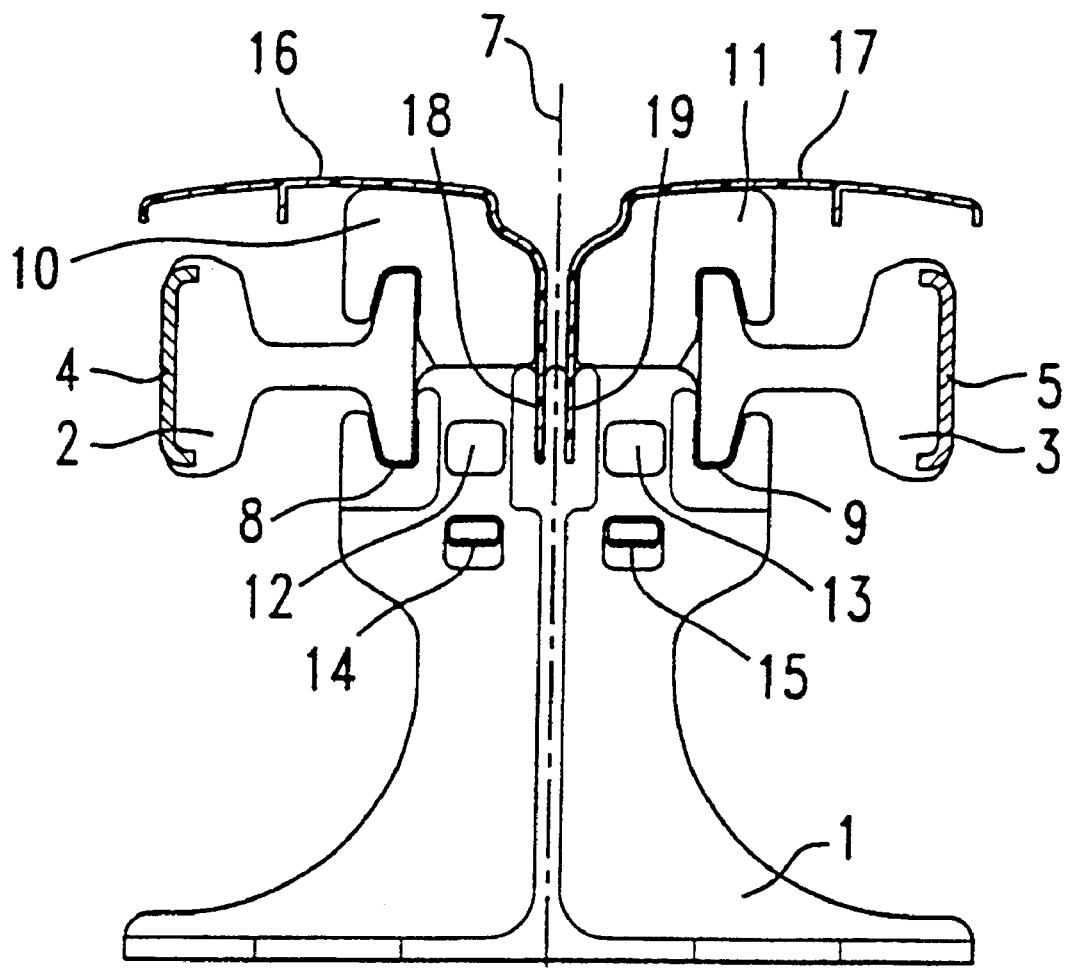
FIG. 3 shows the support body in yet another assembly step.

In FIGS. 1 and 3, a support body is anotated 1. The support body 1 is used to hold, such that they are electrically isolated, two electrically conductive live rails 2 and 3, which have respective contact sliding surfaces 4 and 5. The electrically conductive live rails 2 and 3 can be inserted into the support body 1 in such a manner that the contact sliding surfaces 4 and 5 are arranged parallel to the longitudinal axis 6 of the support body 1 and at an angle to the vertical axis 7 of the support body 1 which can be predetermined. In the chosen illustration in FIGS. 1 to 3, the longitudinal axis 6 is at right angles to the plane of the paper.

The angle to the vertical axis 7 of the support body 1 which can be predetermined is chosen in the illustrated exemplary embodiment such that the contact sliding surfaces 4 and 5 are arranged parallel to the vertical axis 7 of the support body 1. The live rail support can thus be mounted precisely centrally between the two rails (which are not illustrated in the drawing) of a track.

In the embodiment of the live rail support according to the invention illustrated in FIGS. 1 to 3, the feet of the two live rails 2 and 3 can be inserted into respective grooves 8 and 9 in the support body 1 (FIG. 1). The two live rails 2 and 3 are then fixed in their operating position by respective latching-in elements 10 and 11 (FIG. 2).

In order to make it easier to mount the electrically conductive live rails 2 and 3 in the support body 1, the latching-in elements 10 and 11 can be latched in both in their upper respective limit position 12 or 13, and in their lower respective limit position 14 or 15.

When the latching-in element 10 is in the upper limit position 12, the electrically conductive live rail 2 can be inserted into the groove 8 in the support body 1. Analogously, when the latching-in element 11 is in the upper limit position 13, the electrically conductive live rail 3 can be inserted into the groove 9 in the support body 1. When the latching-in element 10 is in the lower limit position 14, the live rail 2 is held at least partially in a positively locking manner and sliding in the support body 1. Analogously, when the latching-in element 11 is in the lower limit position 15, the live rail 3 is held in the support body 1.

In order to ensure that the two electrically conductive live rails 2 and 3 are held in the support body 1 such that they are electrically isolated, the support body 1 is made of an electrically insulating material, preferably plastic (for example GFC).

Once the two latching-in elements 10 and 11 have been latched in their respective lower limit positions 14 and 15, respective live rail covers 16 and 17 for the two electrically conductive live rails 2 and 3 must be inserted into respective holders 18 and 19, which are each in the form of a longitudinal slot.

As can be seen from the above description, the embodiment of the live rail support according to the invention illustrated in FIGS. 1 to 3 allows the electrically conductive live rails 2 and 3 to be mounted in the support body 1 particularly easily and thus also quickly.

What is claimed is:

1. A live rail support, which has a support body for holding two electrically conductive live rails, such that said two live rails are electrically isolated, each said two live rails having at least one contact sliding surface and feet, said feet can be inserted into a respective groove in the support body in such a manner that the contact sliding surfaces are arranged parallel to a longitudinal axis of the support body, and said two live rails can be fixed by means of a holding element which can be plugged on from above, wherein the contact sliding surfaces are arranged at a predetermined angle to the vertical axis of the support body, and wherein the holding element is a latching-in element which can be latched in both in an upper limit position and in a lower limit position, so that in the upper limit position, the two live rails can be inserted into the respective groove and, in the lower limit position, the two live rails are at least partially held in a positively locking manner and sliding in the support body, wherein each said two live rails can be fixed by means of a separate latching-in element.

2. A live rail support, which has a support body for holding two electrically conductive live rails, such that said two live rails are electrically isolated, each said two live rails having at least one contact sliding surface and feet, said feet can be inserted into a respective groove in the support body in such a manner that the contact sliding surfaces are arranged parallel to a longitudinal axis of the support body, and said two live rails can be fixed by means of a holding element which can be plugged on from above, wherein the contact sliding surfaces are arranged at a predetermined angle to the vertical axis of the support body, and wherein the holding element is a latching-in element which can be latched in both in an upper limit position and in a lower limit position, so that in the upper limit position, the two live rails can be inserted into the respective groove and, in the lower limit position, the two live rails are at least partially held in a positively locking manner and sliding in the support body, further comprising at least one holder for at least one live rail cover.

3. A live rail support, which has a support body for holding two electrically conductive live rails, such that said two live rails are electrically isolated, each said two live rails having at least one contact sliding surface and feet, said feet can be inserted into a respective groove in the support body in such a manner that the contact sliding surfaces are arranged parallel to a longitudinal axis of the support body, and said two live rails can be fixed by means of a holding element which can be plugged on from above, wherein the contact sliding surfaces are arranged at a predetermined angle to the vertical axis of the support body, and wherein the holding element is a latching-in element which can be latched in both in an upper limit position and in a lower limit position, so that in the upper limit position, the two live rails can be inserted into the respective groove and, in the lower limit position, the two live rails are at least partially held in a positively locking manner and sliding in the support body, wherein the support body is composed of an electrically insulating material, wherein the support body is composed of plastic, and wherein the support body further comprises at least one holder for at least one live rail cover.

4. A live rail system comprising:

two electrically conductive live rails each having a contact surface and a foot;

a live rail support body having two grooves and two pairs of upper and lower apertures, a respective foot of said two electrically conductive live rails being insertable into a respective one of said two grooves; and two latching-in elements each movable from a first position aligned with one of said upper apertures, so that said two electrically conductive live rails are insertable in said respective one of said two grooves, to a second position aligned with one of said lower apertures, so that said two electrically conductive live rails are held in a positively locking manner.

5. The live rail system as claimed in claim 4, wherein the support body is an electrically insulating material.

6. The live rail system as claimed in claim 5, wherein the insulating material is plastic.

7. The live rail system as claimed in claim 4, further comprising a live rail cover for covering said two electrically conductive live rails.

8. The live rail system as claimed in 7, wherein the support body further comprises a holder for holding said live rail cover.

9. The live rail system as claimed in 8, wherein the holder is a longitudinal slot.

10. A live rail system comprising:

two electrically conductive live rails each having a contact surface and a foot;

a live rail support body having two grooves, a respective foot of said two electrically conductive live rails being insertable into a respective one of said two grooves; and means for latching, so that said two electrically conductive live rails are insertable in said respective one of said two grooves when said means for latching are in a first position, and so that said two electrically conductive live rails are held in a positively locking manner when said means for latching are in a second position.

* * * * *